April 9, 1968  B. E. DAVIS  3,376,745
FLOW METER

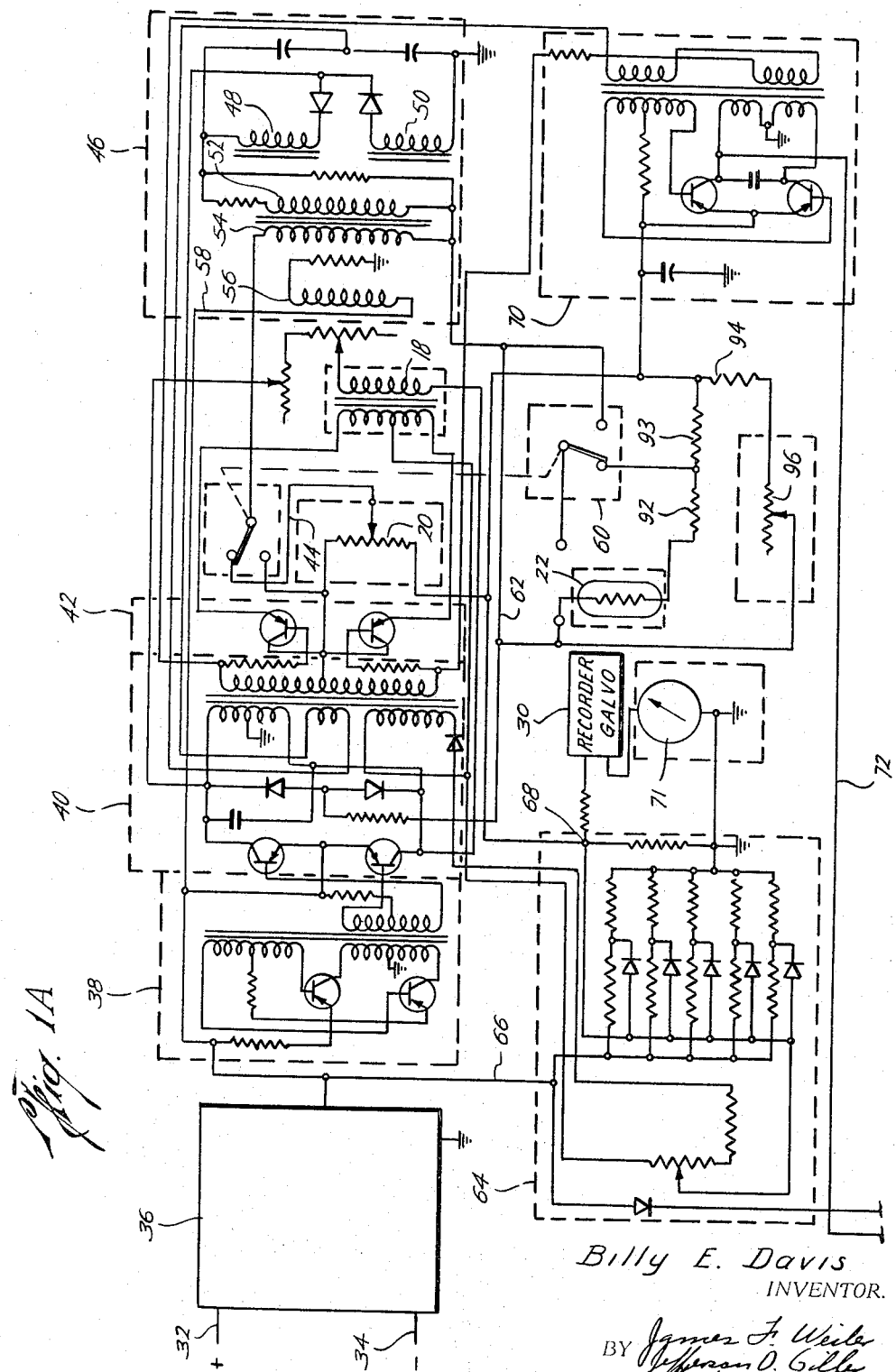

Filed May 26, 1965  3 Sheets-Sheet 3

Billy E. Davis
INVENTOR.

BY
ATTORNEYS 3,376,745
FLOW METER
Billy E. Davis, Houston, Tex., assignor to Camco, Incorporated, Houston, Tex., a corporation of Texas
Filed May 26, 1965, Ser. No. 458,991
2 Claims. (Cl. 73—205)

ABSTRACT OF THE DISCLOSURE

A flow meter for measuring fluid flow through an orifice in a conduit including transducer means for measuring the parameters of flow, a computer connected to the transducer means for solving the flow equation, a square root circuit connected to the computer for providing a signal proportional to the flow rate of the fluid, an integrator integrating the flow rate with a plurality of pulse counting circuits connected in series each of which is actuated by a predetermined signal level from the preceding count circuit, and a selector switch for selectively including any number of said counting circuits for providing the desired counting volume and a counter connected to the counting circuits for measuring the total volume flow. A plurality of counting circuits which include flip flop circuits any number of which may be included for providing the desired counting volume.

---

The present invention relates to flow meters, and more particularly, relates to a meter for measuring fluid flow in a conduit by measuring the various parameters, for example differential pressure, the static pressure in the conduit, and the temperature of the fluid, and computing the volume of flow.

The present invention is an improvement over Patent No. 3,097,527. Generally, the flow of fluid through a pipe can be accurately measured through an orifice plate by determining the differential pressure across the orifice, the line pressure, and the temperature of the flowing fluid. These factors are related by the following equation:

$$F = C\sqrt{\frac{DP}{T}}$$

where

F is the rate of flow
P is the static pressure
D is the differential pressure across the orifice
T is the temperature of the flowing fluid
C is a correction constant The total volume of flow, V, over a given period is then $$V = \int F\, dt$$

The general object of the present invention is to provide a flow meter to measure the parameters that determine the rate of flow and to automatically compute and indicate the flow rate and total flow.

Yet a still further object of the present invention is the provision of a flow meter which measures the parameters of flow, provides a correction coefficient, and computes the total flow of fluid.

A still further object of the present invention is the provision of a flow meter for measuring fluid flow through an orifice in a conduit by providing measuring means for measuring the differential pressure D across the orifice, the static pressure P in the conduit, and the temperature T of the fluid and providing a computer for receiving the output from each of these measuring means and solving for the quantity $PD/T$ and transmitting this quantity to a square root circuit which provides an output signal proportional to the quantity $PD/T$, and an integrator which receives the square root circuit output, and integrates this output to provide a signal which measures total flow of the fluid.

A still further object of the present invention is the provision of a flow meter which measures the parameters of flow and computes the total flow of the fluid and provides a selectively pulse counting circuit which may provide a counting pulse for any desired predetermined unit of flow volume measured and which actuates a counter to count the total flow.

Still a further object of the present invention is the provision of a flow meter for measuring fluid flow through an orifice in a conduit by measuring the flow parameters and providing a magnetic amplifier of the saturable reactor type to which the flow parameters are electrically connected to provide an accurate computation of the fluid flow and includes a counting circuit which can be varied in accordance with the volume of flow to provide accurate output measurement of the fluid flow.

Figure 1B:
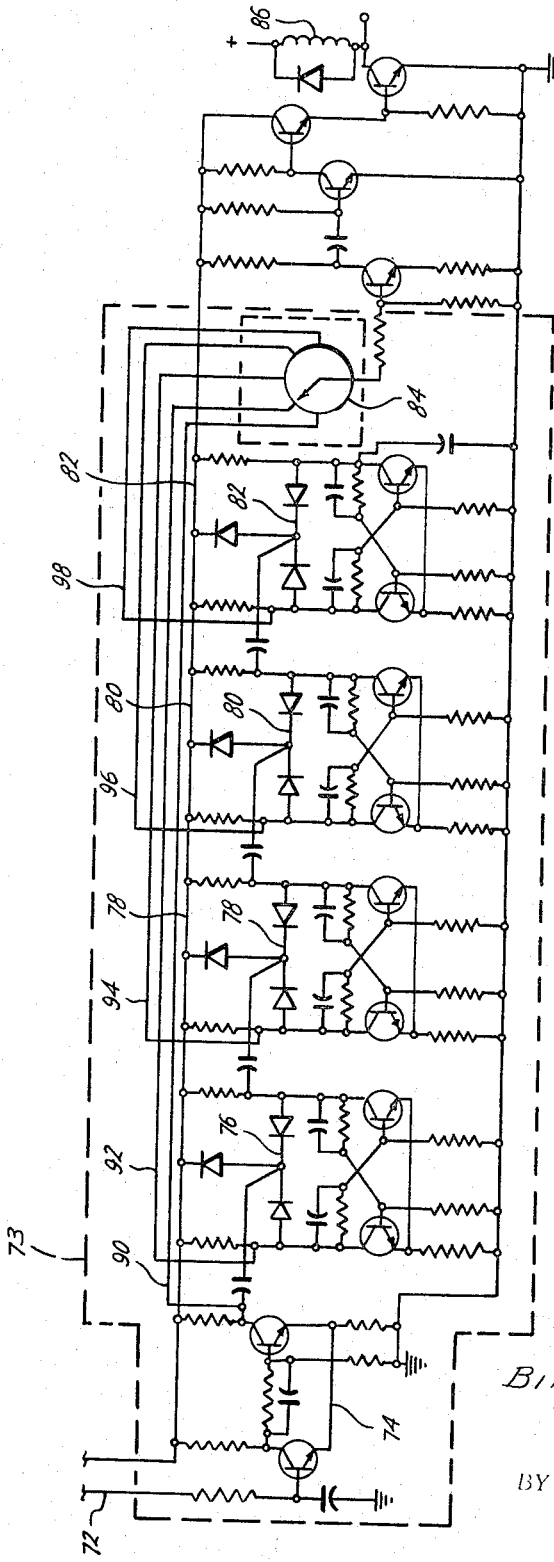
Figure 2:
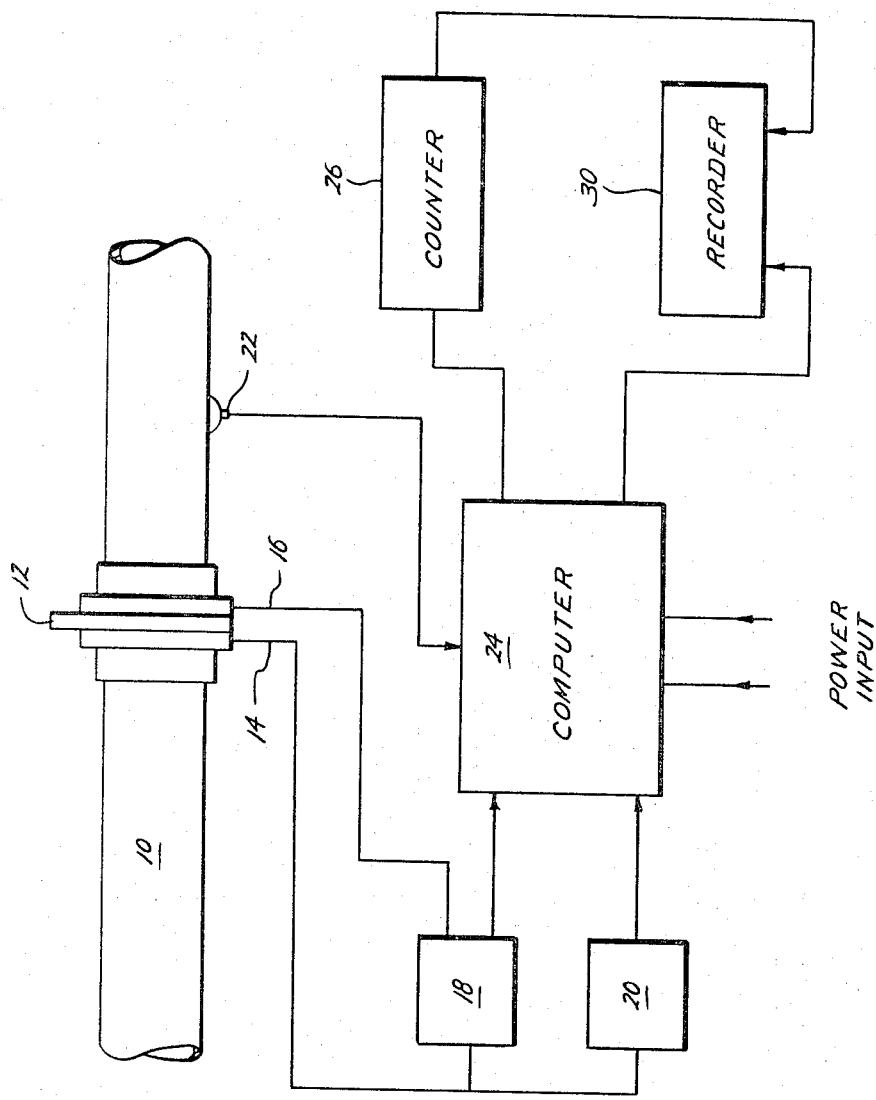

Other and further objects, features and advantages will be apparent from the following description of a presently-preferred embodiment of the invention, given for the purpose of disclosure and taken in conjunction with the accompanying drawings, where like character references designate like parts throughout the several views and where, FIGURE 1A is an electrical schematic drawing of one portion of the present invention, FIGURE 1B is a continuation of FIGURE 1A and, FIGURE 2 is a schematic drawing of the installation of the present invention.

Referring now to the drawings, and particularly to FIGURE 2, the reference numeral 10 generally designates a pipe through which fluid flow is to be measured. A conventional orifice plate 12 may be placed in the pipe 10 and suitable taps are made to the line 10 such as pressure taps 14 and 16 whereby a suitable differential pressure measuring means such as a transducer 18 and a suitable static pressure measuring means such as a transducer 20 are provided to measure the pressure drop D across the orifice plate 12 and the static pressure P in the line 10. A temperature probe 22 is provided to measure the temperature T of the flowing fluid. The measurements from the transducers 18, 20 and 22 are transmitted to a flow computer 24 which will use the measuring parameters to automatically compute and indicate the flow rate and total flow on a counter 26 or on a strip chart recorder 30. If the temperature of the fluid being measured is constant, the temperature transducer may be omitted. Similarly, in the case of incompressible liquids, the pressure transducer may be omitted. And of course, the differential pressure measuring means may suitably measure a pressure differential other than across an orifice plate.

Referring now to FIGURE 1A, a suitable power source, for example a battery (not shown) may be connected across the terminals 32 and 34 to a suitable voltage regulator 36 to provide a constant DC voltage output.

A suitable converter 38 is connected to the DC output of the voltage regulator 36 to convert a portion of the DC voltage of the converter to a 400 cycle AC voltage.

The AC voltage from the converter 38 is then transmitted to a suitable amplifier 40, all of which is conventional, and which no further description is believed to be necessary. The differential pressure transducer 18, which for example may be a shiftable core type, is connected to a power supply such as amplifier 40 and is responsive to the pressure differential across the orifice in the pipeline. The output of the differential pressure transducer is fed to a synchronous rectifier 42 which in turn provides a DC output which varies with the differential pressure P across the orifice 12 in the line 10. DC current from the synchronous rectifier 42 is connected to and flows through the static pressure transducer 20 and thereby presents at the arm 44 a signal proportional to PD.

A suitable amplifier such as a magnetic amplifier 46 is provided with power windings 48 and 50, feedback winding 52, input or control winding 54, and bias winding 56. The bias winding 56 is connected to a suitable source of direct current through lead 58 such as to voltage regulator 36. The input signal from the differential pressure transducer 18 and the static pressure transducer 20 is transmitted through a test switch 60 to the control winding 54 of the amplifier 46.

A temperature transducer 22 receives the output from the amplifier 46 and provides a feedback signal through lead 62 to the control winding 54 of the amplifier 46 to divide the function PD by T. This feedback of the temperature measurement results in an accurate computation of the desired measurement which does not change with loading and thereby provides a more accurate result by the computer.

Test switch 60 is provided to bypass the static transducer 20 and test switch 90 is provided to bypass the temperature transducer 22. Thus, when both switches 60 and 90 are actuated to bypass the transducers 20 and 22, only the effects of the differential pressure transducer 18 will remain in the circuit. By selectively actuating the switches 60 and 90 the various transducers 18, 20 and 22 may be tested. Potentiometers 92, 93 and 94 are provided for calibrating purposes. And potentiometer 96 is provided to place a factor into the computer to satisfy the correction constant C.

A square root circuit 64 is provided having a power source 66 to the voltage regulator 36 and the square root circuit 64 also receives a signal proportional to $PD/T$ and provides at its output 68 a signal proportional to the $PD/T$ which as previously defined is proportional to the rate of flow of the fluid in the pipe 10. This flow rate may be indicated visually on a meter 71 or may be recorded on a strip chart recorder 30.

An integrator 70 is then provided to receive the output flow rate signal from the square root circuit 64 and integrates the flow rate to provide the total flow of the fluid at integrator output 72.

The total flow signal is then passed to a pulse counting circuit 73, preferably having a plurality of counting circuits which are each actuated upon a predetermined voltage signal. That is, pulse circuit 74 is actuated upon a predetermined voltage signal from the integrator 70 and thus provides a pulse signal output for a predetermined unit of flow volume at line 90. If the predetermined unit of flow volume actuating pulse circuit 74 is a convenient unit of measurement, switch 84 is set to transmit this signal from line 90 directly to a counter 86 which will count each of the units of flow volume measured by circuit 74. However, if the flow is large enough so that the unit of flow volume being measured by pulse circuit 74 is inconvenient, switch 84 is actuated to place one or more of the flip flop pulse circuits 76, 78, 80 and 82 into series with the pulse circuit 74 so that the output pulse in circuit 74 will then actuate the next pulse counting circuit in series. Switch 84 is selectively connected to the outputs 90, 92, 94, 96 or 98 of the pulse circuits. The addition of each counting circuit multiplies the unit of flow volume being measured by a factor of 2 for each pulse counting circuit added by the switch 84 before the counter 86 is actuated. Thus, the switch 84 is a selector switch for determining the unit of flow volume being measured by the counter 86. And, of course, the counter 86 will then be a measure of the accumulated flow of the fluid through the conduit 10 which may also be recorded on the strip chart recorder 36.

The present invention, therefore, is well adapted to carry out the objects and attain the ends and advantages mentioned as well as others inherent therein. While a presently-preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. In a flow meter for measuring fluid flow in a conduit including measuring means for measuring the parameters of fluid flow, the improvement comprising:

a magnetic amplifier of the saturable reactor type including a control winding, a bias winding, and a feed back winding, said control winding electrically connected to said measuring means and receiving all of the measurements of the flow parameters, a square root circuit having input connected to the output of the amplifier, and having an output whose current is proportional to the current in the circuit input, an integrator circuit having an input and output, the input being connected to the output of said square root circuit, and the output providing a signal proportional to the total fluid flow, a pulse counting circuit having an input and output, the input connected to and actuated by the output of the integrator and including a plurality of counting circuits connected in series each of which is actuated by a predetermined signal level from the preceding counting circuit, and a selector switch for selectively including any number of said counting circuits for providing a desired counting volume, and a counter connected to the output of the pulse counting circuit, and actuated by each pulse to count the total volume flow.

2. A flow meter for measuring fluid flow through an orifice in a conduit comprising:

transducer means for measuring a differential pressure across the orifice, transducer means for measuring the static pressure in the conduit, computer means for receiving the output from each of said transducer means and solving for and providing at the computer output the product of said transducer means, a square root circuit having an input and an output, the input being connected to the output of the computer means whereby the square root circuit output provides a signal proportional to the flow rate of the fluid, an integrator connected to and receiving the output of the square root circuit for integrating said flow rate and providing a signal proportional to total fluid flow at the integrator output, a pulse counting circuit having an input and output, the input connected to and actuated by the output of the integrator and including a plurality of flip flop counting circuits connected in series each of which is actuated by a predetermined signal level from the preceding flip flop counting circuit, a selector switch for selectively including any number of said flip flop counting circuits for providing a desired counting volume, and a counter connected to the output of the pulse counting circuit and actuated by each pulse to count the total volume flow.

References Cited

UNITED STATES PATENTS

| | | | |
|---|---|---|---|
| 2,919,578 | 1/1960 | Sink | 73—206 |
| 3,016,197 | 1/1962 | Newbold | 235—151.34 XR |
| 3,029,637 | 4/1962 | Fellows | 73—194 |
| 3,040,575 | 6/1962 | Sable. | |
| 3,096,434 | 7/1963 | King | 235—151.34 |
| 3,097,527 | 7/1963 | Davis et al. | 73—205 |
| 3,173,003 | 3/1965 | Muller-Girard | 73—205 X |

FOREIGN PATENTS 770,736　3/1957　Great Britain.

RICHARD C. QUEISSER, *Primary Examiner.*

E. D. GILHOOLY, *Assistant Examiner.*